3,164,582
CYANOCOBALAMIN COMPLEXES

David R. Walters, New Brunswick, and Oleh T. Ratych, Edison, N.J., assignors to Olin Mathieson Chemical Corporation, New York, N.Y., a corporation of Virginia
No Drawing. Filed June 29, 1962, Ser. No. 206,157
3 Claims. (Cl. 260—211.5)

This invention relates to a new compound having vitamin B–12 activity. More particularly, this invention relates to a complex of cresol and cyanocobalamin having important physical properties.

Cyanocobalamin is well recognized as a vital nutritional factor in the maintenance of health and as a therapeutic agent in the correction or alleviation of various disorders and diseases. The present invention makes available a complex having the full range of vitamin B–12 activity and serving, additionally, as a valuable intermediate in the preparation of liquid compositions containing pure cyanocobalamin.

Pure cyanocobalamin has been prepared heretofore by processes which involve a final step of crystallization, effecting a very substantial increase in purity. Since the cyanocobalamin is in dilute solution, this step requires either the addition of large volumes of precipitating solvents, or the use of elevated temperature to reduce the volume, with resultant losses of the very valuable material being concentrated.

Such disadvantages are avoided through the complex of this invention which, as heretofore stated, is a valuable intermediate in the preparation of liquid compositions containing pure cyanocobalamin. The air-dried crystals of the complex have the composition

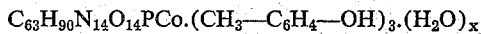

$$C_{63}H_{90}N_{14}O_{14}PCo\cdot(CH_3-C_6H_4-OH)_3\cdot(H_2O)_x$$

where $x$ is a whole integer of less than ten and may vary depending upon the extent to which the complex is dried. The complex is characterized by the following properties distinguishing it from pure crystalline cyanocobalamin:

LLD activity (calculated): About 8.5 million units per mg. Infrared spectrum in Nujol mull:

Wavelength, $\mu$

| | |
|---|---|
| 3.05 S | 9.43 W |
| 4.71 W | 9.53 M |
| 6.02 S | 9.98 M |
| 6.25 M | 10.05 W |
| 6.37 M | 10.76 W |
| 6.64 M | 11.01 W |
| 8.29 M | 11.52 M |
| 8.78 M | 11.74 M |
| 8.99 W | 12.12 M+ |
| 9.24 M | 13.10 W |
| | 13.54 W |

+ Attributable to presence of para-cresol.

The procedure employed in the practice of this invention for the production of the novel complex is a method which comprises adding a cresol to an aqueous solution of vitamin B–12 concentration of fermentation origin, the concentration of vitamin B–12 being at least about 1000 gamma per ml. and a concentration of the cresol being less than the limit of its solubility in the aqueous solution of vitamin B–12 concentrate (i.e., there being only a single phase); and recovering the complex which crystallizes from the resulting solution.

The cresol which may be employed in the practice of this invention is para-cresol. Surprisingly, it has been found that while meta- and ortho-cresol cannot be successfully employed in the practice of this invention, para-cresol gives most satisfactory results.

The efficiency of separation of the complex from the solution is a function of several factors, including the concentration of vitamin B–12 in the concentrate, the purity of the concentrate and the concentration of the cresol employed. In addition, there is the usual effect of temperature, time and the addition of seed crystals in the complex. At room temperature, para-cresol is soluble in water to the extent of about 1.8% and the cresol concentration employed is preferably that concentration which is less than the solubility limit which will effect the most efficient separation of the complex, readily determinable by test of a sample of each batch.

In various methods of purifying vitamin B–12, a "phenol solvent" (i.e., either phenol per se or phenol dissolved in another substantially water-immiscible solvent) is employed to extract an activity concentrate and the activity transferred back to aqueous solution. In this method, because of the solubility of the phenol in water, some of the phenol will be left in the aqueous solution. Therefore, in some cases, it may be necessary prior to adding the cresol for the purpose of forming a complex to remove this residual phenol from the solution. This may be accomplished by washing the solution with a water immiscible solvent, such as chloroform or ether.

The preferred conditions for the practice of this invention are as follows: the concentration of vitamin B–12 is in the order of 5,000 to 8,000 $\gamma$/ml., with the vitamin B–12 being substantially entirely in the cyanocobalamin form; the cresol concentration is of the order of 0.3 to 1.7% and the vitamin B–12 concentrate is one which has been partially purified by a process involving extraction of the activity by a water-immiscible solvent and subsequently transferring this activity back to aqueous solution. The cresol cyanocobalamin complex can be dried upon separation from the cresol-containing solution and employed in the solid, crystalline form or it may be converted into cyanocobalamin. Because of the facile dissociation of these complexes, this conversion can be effected, for example, by dissolving the complex in water and extracting the resulting aqueous solution with an organic water-immiscible solvent for the cresol or by steam-distilling the complex, in each case yielding a solution of substantially pure cyanocobalamin. This solution is suitable for subdivision and filling into ampules or vials for parenteral administration in the treatment of conditions (such as pernicious anemia) requiring vitamin B–12 therapy, as well as for other uses where crystalline vitamin B–12 is employed.

The following examples are illustrative of the practice of this invention:

EXAMPLE 1

To 20 ml. of vitamin B–12 concentrate, 63.3% pure, having an initial potency of 6410 mcg./ml., is added Dowex 1X1 (hydroxyl) resin in small portions until the pH is adjusted to pH 10.4. The mixture is then filtered, and the resin is washed with three 5 ml. portions of water to remove adsorbed activity. The combined filtrate and washings are adjusted to pH 5 with 10% sulfuric acid.

Fifteen milliliters of the resulting solution are heated to 95° with accompanying agitation, and to it there is added 0.25 ml. (1.6%) para-cresol. After all the para-cresol is dissolved, agitation is discontinued and the solution is allowed to cool slowly to 5° C. Crystallization of the complex begins shortly, and the vitamin B–12 concentration in the mother liquor is 950 mcg./ml., 551 mcg./ml. and 371 mcg./ml. after 1, 2 and 7 days, respectively.

Filtration of the mixture, washing the crystals with acetone and air drying the product at room temperature gives 91 mg. of bright red B–12 para-cresol complex.

EXAMPLE 2

One hundred forty milliliters of vitamin B–12 concentrate containing 1.075 g. of activity having a purity of 96.5% is heated to 80° C. on a steam bath, and para-cresol, 1.75 ml. (1.25%) is added slowly with stirring. When the solution is cooled to 45° C., it is then seeded with crystalline B–12-para-cresol complex and stored at 5° C. for 20 hours. Filtration yields 1.1305 g. of air-dried complex, and a filtrate which contains 865 mcg./ml. of activity.

Analysis of B–12-para-cresol complex.—For $$C_{63}H_{90}N_{14}O_{14}PCo(CH_3C_6H_4OH)_3 \cdot (H_2O)_5$$

|  | Calc'd | Found |
|---|---|---|
| Percent B–12 | 76.5 | 76.3 (by spectrophotometry). |
| Percent para-cresol | 18.3 | 19.0 (by coulimetric analysis). |
| Percent Co | 3.33 | 3.20 (by colorimetry). |
| Percent H₂O | 5.09 | 5.07. |

EXAMPLE 3

Sixteen liters of an aqueous vitamin B–12 concentrate having a potency of 6325 γ/ml. and a purity of 58% based upon total solids (obtained from the cell material formed by a *Propionibacterium freudenreichii* fermentation as described in U.S. Patent No. 2,816,856 by an extracting procedure involving a transfer of activity to a phenol solvent and then transfer back to aqueous solution) is washed with two 5 liter portions of chloroform to remove all residual phenol; the aqueous layer is recovered and residual chloroform removed by distillation in vacuo. The concentrate is treated batchwise with Dowex 1X1 (hydroxyl) to pH 10.4, and the mixture is filtered. This step increases the purity of the activity in solution to 82%. After sulfuric acid is added to pH 5 the solution is warmed to 80° C. and 200 ml. (1.33%) para-cresol is added slowly with stirring. The solution is allowed to cool slowly to room temperature and then stored at 5° for 3 days. The crystalline B–12-para-cresol complex obtained is filtered off, washed with acetone and air-dried. The product weighs 99.7 g.

The conversion of the cresol-cyanocobalamin to substantially pure cyanocobalamin is shown in the following examples:

EXAMPLE 4

4.71 g. of crystalline product obtained as described in Example 3 is stirred in 600 ml. of water at 50° C. After cooling to 22° C. the aqueous solution is extracted twice with 200 ml. portions of chloroform. The separated aqueous layer is recovered and any dissolved chloroform removed therefrom by short concentration in vacuo. The resulting aqueous solution of substantially pure cyanocobalamin is suitable for use in vitamin B–12 therapy wherever a product of the purity of crystalline B–12 is required or preferred.

The addition of 8 volumes of acetone to the aqueous solution yields crystalline cyanocobalamin having an anhydrous purity of 98.7%.

EXAMPLE 5

The crystalline product obtained in Example 3 is converted to substantially pure cyanocobalamin as described in Example 4 employing ether in place of chloroform. The substantially pure cyanocobalamin solution here obtained also is suitable for use in vitamin B–12 therapy whenever a product of the purity of crystalline cyanocobalamin is required or preferred.

EXAMPLE 6

Four hundred thirty milligrams of crystalline vitamin B–12-para-cresol complex obtained as described in Example 1 is converted into substantially pure cyanocobalamin by dissolving in 75 ml. of water with slight warming and adding 9 volumes of acetone. After standing at 5° C. for 12 hours there is obtained 98.3% (anhydrous) pure crystalline cyanocobalamin in almost quantitative yield.

EXAMPLE 7

Crystalline vitamin B–12-para-cresol is converted to substantially pure cyanocobalamin as described in Example 5, except that dichloroethane is employed in place of chloroform, yielding an aqueous solution of substantially pure cyanocobalamin.

This invention may be variously otherwise embodied within the scope of the appended claims.

What is claimed is:

1. Crystalline cyanocobalamin-cresol complex, wherein the cresol is para-cresol.
2. The method of purifying cyanocobalamin which comprises:
    (a) adding para-cresol to an aqueous solution of vitamin B–12 activity concentrate of fermentation origin, the concentrate of B–12 being at least about 2000 gamma per ml., the concentration of the cresol being at least about 0.3% and not above the limit of its solubility in the aqueous concentrate;
    (b) recovering the crystalline complex compound from the resulting solution; and
    (c) converting the said crystalline complex into cyanocobalamin.
3. The method defined by claim 2 wherein the conversion of the complex into cyanocobalamin is effected by steam distilling the said complex yielding an aqueous solution of substantially pure cyanocobalamin.

References Cited in the file of this patent

UNITED STATES PATENTS

| 2,823,165 | Bernhauer et al. | Feb. 11, 1958 |
| 2,937,167 | Bernhauer et al. | May 17, 1960 |
| 2,984,661 | Nomine et al. | May 16, 1961 |